United States Patent [19]

Bravet et al.

[11] Patent Number: 4,891,271
[45] Date of Patent: Jan. 2, 1990

[54] BILAYER WINDSHIELD AND PREFORMED TWO-PLY SHEET FOR USE THEREIN

[75] Inventors: Jean L. Bravet; Daniel Colmon, both of Thourotte; Gerard Daude, Villeneuve d Oron; Michel J. Moncheaux, Compiegne, all of France

[73] Assignee: Saint-Gobain Vitrage, Paris, France

[21] Appl. No.: 236,240

[22] Filed: Aug. 25, 1988

Related U.S. Application Data

[63] Continuation of Ser. No. 33,873, Apr. 2, 1987, Pat. No. 4,784,916, which is a continuation of Ser. No. 629,370, Jul. 10, 1989, abandoned.

[30] Foreign Application Priority Data

Jul. 11, 1983 [FR] France ............................. 83 11506
Jul. 11, 1983 [FR] France ............................. 83 11507
Jul. 11, 1983 [FR] France ............................. 83 11508

[51] Int. Cl.$^4$ ..................... B32B 17/10; B32B 27/40
[52] U.S. Cl. ..................... 428/423.1; 428/423.3; 428/425.6
[58] Field of Search ............. 428/423.1, 423.3, 425.6

[56] References Cited

U.S. PATENT DOCUMENTS

| | | | |
|---|---|---|---|
| 4,218,500 | 8/1980 | Rädisch | 428/423.3 |
| 4,321,296 | 3/1982 | Rougier | 428/425.6 |
| 4,584,229 | 4/1986 | Bourelier et al. | 428/423.3 |
| 4,643,944 | 2/1987 | Agethen et al. | 428/423.3 |
| 4,671,838 | 6/1987 | Bravet et al. | 428/425.6 |
| 4,784,916 | 11/1988 | Bravet et al. | 428/423.3 |

FOREIGN PATENT DOCUMENTS

| | | | |
|---|---|---|---|
| 54491 | 6/1982 | European Pat. Off. | 428/425.6 |
| 199649 | 12/1982 | Japan | 428/425.6 |
| 1576394 | 10/1980 | United Kingdom | 428/425.6 |

*Primary Examiner*—William J. Van Balen
*Attorney, Agent, or Firm*—Oblon, Spivak, McClelland, Maier & Neustadt

[57] ABSTRACT

Preformed, two-ply, optical, energy-absorbing, flexible polyurethane sheet including a self-healing surface and a surface which is adhesive under the influence of heat and pressure; bilayer glazing laminates and bilayer automotive safety windshields including said two-ply sheet; said two-ply sheet comprises a self-healing ply and an energy-absorbing adhesive plyurethane ply which is prepared preferably by reactive-casting on a horizontal support and formed preferably from a polyisocyanate monomer including from about 2 to about 10 wt. % of urea groups.

3 Claims, No Drawings

BILAYER WINDSHIELD AND PREFORMED TWO-PLY SHEET FOR USE THEREIN

This is a continuation of application Ser. No. 033,873 filed Apr. 2, 1987 now U.S. Pat. No. 4,784,916, and which is a continuation of Ser. No. 06/629,370 filed July 10, 1984, now abandoned.

FIELD OF THE INVENTION

The present invention relates to a preformed two-ply plastic sheet having energy-absorbing, adhesive, and scratch resistant properties, and to a glazing laminate including said sheet and methods and compositions useful for the preparation of said sheet and laminate. This invention relates also to a bilayer laminate having improved moisture resistant, energy-absorbing, optical and scratch resistant properties and, in particular, to an improved vehicle windshield including an inner exposed ply of scratch resistant, anti-lacerative, self-healing plastic material.

REPORTED DEVELOPMENTS

The patent literature extending over a period of almost half a century reveals numerous efforts to fabricate a bilayer laminate which is useful as a vehicle safety windshield and which comprises a single ply of glass and a ply of energy-absorbing, mar-resistant plastic material. That the products of such attempts have not been entirely satisfactory is evidenced by the present unavailability of a commercially acceptable bilayer windshield.

Bilayer laminates are disclosed in U.S. Pat. Nos. 3,808,077; 3,881,043; 3,900,686; 4,041,208; 4,085,092; 4,109,055; 4,139,764; and 4,039,720; and in the following copending U.S. applications, each of which is assigned to the same assignee as the present application, Ser. Nos. 213,225; 274,547; and 579,035. Invariably the plastic ply of the bilayer laminates disclosed therein have one or more desirable properties, such as energy absorption, optical clarity, or chemical resistance, but are either impractical to manufacture and/or deficient in one or more other properties, such as, for example, adhesive strength, mar-resistance, or moisture sensitivity. For example, bilayer laminates comprising a single plastic ply having acceptable scratch resistant properties suffer from a decided lack of energy-absorbing and adhesive properties, while those bilayer laminates having acceptable energy-absorbing properties suffer from a decided lack of scratch resistance and a lack of adhesive properties. The prior art has dealt with some of these shortcomings such as insufficient adhesive strength by utilizing an adhesion promoter or separate adhesive layer, while the deficiencies such as inadequate scratch resistance have been approached by providing a separate surface treatment such as a hard or soft scratch resistant coating or by providing a two-ply plastic sheet which combines the desirable properties of two materials in one ply. However, these approaches have also encountered problems, such as deficiencies in one or more other properties including optical clarity.

Many plastics, including polyvinyls, polycarbonates, and polyurethanes, have been proposed for use in bilayer laminates. Polyurethanes have been widely used as both an exposed ply and as an interlayer sandwiched between two sheets of glass or plastic. Various types of polyurethanes have been described for such glazing uses in the patents and applications mentioned above, as well as in U.S. Pat. Nos. 3,509,015, 3,620,905, and 4,241,140, but they do not possess to the desired extent all of the properties that are needed in a plastic sheet for use in a successful bilayer windshield.

The present invention relates to an improved polyurethane sheet which is particularly useful for preparing a bilayer glazing laminate as the result of its possessing a combination of properties that are required in this type of safety product.

SUMMARY OF THE INVENTION

The present invention relates to a preformed transparent two-ply sheet having optical properties and comprising a self-healing ply and an energy-absorbing polyurethane ply, characterized in that said polyurethane ply is prepared by reactive casting on a level, horizontal support, a reaction mixture including: an isocyanate component, having a viscosity of less than 5000 mPaS at 40° C., and comprising an aliphatic diisocyanate, a cycloaliphatic diisocyanate or an isocyanate prepolymer; and, a polyol component comprising a polymeric diol having a molecular weight (hereinafter "MW") of about 500 to about 4000, and a short chain diol.

The present invention relates also to a preformed flexible multi-ply transparent sheet, effective for use in a bilayer glazing laminate, having optical, moisture resistant, and energy-absorbing properties effective for use in a bilayer glazing laminate, one ply of which comprises a self-healing thermoset polymeric material, the other ply of which comprises an energy-absorbing polyurethane ply which is substantially non-tacky at room temperature but which is capable of itself being adhesive under the influence of heat and pressure, said sheet characterized in that, as an exposed ply in a glazing laminate, it is capable of maintaining, in the absence of an adhesion promoter, effective adhesion as measured by the temperature and moisture conditions of Test Nos. 3 and 4, American Standard Safety Code for Safety Glazing Materials for Glazing Motor Vehicles Operating on Land Highways, Revision Z26.1 - 1966 (hereinafter "ANSI-Z26").

This invention relates also to a method for the preparation of a preformed flexible, transparent multi-ply polyurethane sheet of the type described above comprising:

(1) depositing on a horizontal support a liquid film comprising a solvent-free mixture of monomers capable of forming a thermoset polymeric material;

(2) forming a solid underlying film of thermoset polymeric material by polymerizing said monomers while on said support;

(3) depositing on said supported underlying film a liquid film comprising a solvent-free mixture of monomers capable of forming an energy-absorbing polyurethane ply and a polyurethane forming catalyst;

(4) forming a solid, optical, energy-absorbing overlying polyurethane ply within about an hour, thereby forming said multi-ply sheet; and (5) removing said multi-ply sheet from said support.

A further aspect of the present invention relates to a bilayer glazing laminate which exhibits optical, energy-absorbing, moisture and temperature resistant, and abrasion resistant properties as required by ANSI Z26, Test Nos. 1–4, 9, 12, 15–19, 24, 26 and 28, comprising a multi-ply preformed sheet as described above adhered to a glass or plastic ply.

Another aspect of the present invention relates to a bilayer safety windshield comprising the present multi-ply preformed sheet adhered to a glass ply and which complies with the testing requirements of 49 CFR 571.205 (S5.1.2.3) [as amended Nov. 16, 1983].

Other aspects of the present invention, including methods for the preparation of glazing laminates, are described herein.

DETAILED DESCRIPTION OF THE INVENTION

The term "adhesion promoter" means a material which, when added to a polyurethane solution or to the reaction mixture from which the polyurethane is prepared, or when used to coat the surface of a polyurethane article, improves the strength and longevity of an adhesive bond including said polyurethane. Exemplary adhesion promoters include alkoxy silanes such as: gamma aminopropyl-triethoxysilane, sold as "A-1100" by Union Carbide Corp. or by Dow Corning as "Z-6020"; and N-(beta-amino ethyl) gamma aminopropyl-trimethoxysilane sold by Union Carbide Corp. as "A-1120." Adhesion promoters are disclosed also in U.S. Pat. No. 3,881,043.

The sheet of the present invention possesses exceptional adhesive properties of the type required in a safety windshield in the absence of the use of an adhesion promoter. However, it should be understood that an adhesion promoter may be used in the practice of the present invention for reasons which are independent of the inherent adhesive properties possessed by the sheet invention. For example, an adhesion promoter can be used to compensate for a decrease in sheet adhesion due to the presence of an adhesion inhibitor such as a silicone flow enhancing agent, or to improve the adhesive properties of the sheet in a manner such that they exceed the present industry safety standards for the adhesive requirements of a glazing laminate.

The surface of the energy-absorbing ply of the present sheet is substantially non-tacky at room temperature (for example, about 15° C. to about 35° C.), that is, at temperatures likely to be encountered in a facility in which the sheet is manufactured, stored, and/or used in preparing a glazing laminate. At temperatures in excess of about 35° C., its adhesive surface is softened to the extent that when the sheet is pressed to a glass or plastic substrate, it is capable of flowing and adhering to the substrate to an extent that the sheet does not slip or slide on the surface of the substrate. Treatment of the assembly resulting from the sheet and substrate at elevated temperature and pressure forms a laminate comprising an exposed ply of the present sheet. The adhesive bond formed by the sheet to the underlying ply of the laminate maintains its bond, even in the absence of the use of an adhesion promoter, under adverse temperature and humidity conditions, as evaluated in ANSI Z26 Test Nos. 3 and 4, described in detail below.

The exceptional nature of the adhesive bond of the sheet, as well as the energy-absorbing, optical and other properties of the sheet and laminates according to the present invention may be evaluated according to standard tests published by the American Standards Association in American Standard Safety Code for Safety Glazing Materials for Glazing Motor Vehicles Operating on Land Highways, Revision Z26.1-1966 ("ANSI-Z26") and according to tests published in Addendum 42: Regulation No. 43 of the "United Nations Agreement Concerning the Adoption of Uniform Conditions of Approval and Reciprocal Recognition of Approval for Motor Vehicle Equipment and Parts" (hereinafter "ECE R43"), hereby incorporated by reference.

The temperature and moisture resistance of the present laminates may be evaluated by the ANSI-Z26 Humidity and Boil test procedures, reproduced below.

Humidity, Test No. 3
5.3.1 Purpose of Test
  The purpose of this test is to determine whether the safety glass will successfully withstand the effect of moisture in the atmosphere over an extended period of time.
5.3.2 Procedure
  Three 12×12-inch flat specimens, as submitted, shall be kept for 2 weeks in a closed container over water. The temperature of the air in the container shall be maintained within the limits of 120° and 130° F. (These conditions give a relative humidity of about 100 percent.)
5.3.3. Interpretation of Results
  No separation of materials shall develop, except for occasional small spots, no one of which shall extend inward from the adjacent edge of the specimen to a depth of more than ¼ inch.
Boil, Test No. 4 (this test is not applicable to multiple glazed units.)
5.4.1 Purpose of Test
  The purpose of this test is to determine whether the safety glass will successfully withstand exposure to tropical temperatures over an extended period of time.
5.4.2 Procedure
  Three 12×12-inch flat specimens, as submitted, shall be immersed, vertically on edge, in water at 150° F. for 3 minutes and then quickly transferred to and similarly immersed in boiling water. The specimens shall be kept in the boiling water for 2 hours and then removed.
5.4.3. Interpretation of Results
  The glass itself may crack in this test, but no bubbles or other defects shall develop more than ½ inch from the outer edge of the specimen or from any cracks that may develop. Any specimen in which the glass cracks to an extent confusing the results shall be discarded without prejudice and another specimen shall be tested in its stead.

The laminates of the present invention both prepared with and without an adhesion promoter additive, pass ANSI-Z26 Test Nos. 3 and 4.

The energy-absorbing, adhesive ply of the sheet within the scope of the present invention can be prepared from a reaction mixture comprising a polyisocyanate component, a polymeric polyol and a low molecular weight diol. A preferred embodiment of the present invention comprises an adhesive polyurethane ply formed from a reaction mixture including a polyisocyanate monomer component containing about 2 to about 10 wt. % of urea groups.

The polyurethane-forming components are present in the reaction mixture such that the molar ratio of the available NCO groups to available OH groups is about 0.8:1 to about 1:1. As the NCO/OH ratio becomes greater than one, for example, about 1.01:1 to about 1.1:1, the sheet becomes more rigid. When the polyurethane forming monomers are all difunctional, the NCO/OH ratio is preferably 0.9:1 to 1:1, and most preferably the ratio is about 1:1.

The polyisocyanate component comprises an aliphatic, cycloaliphatic or prepolymer polyisocyanate and preferably a diisocyanate. Exemplary diisocyanates include: 1,6-hexamethylene diisocyanate (HMDI); 2,2,4-trimethyl-1,6-hexane diisocyanate (TMDI); bis(4-isocyanatocyclohexyl)methane in any number of differing isomeric ratios, preferably the isomeric mixture sold as "Hylene W"; bis(3-methyl-4-isocyanatocyclohexyl)methane; 2,2-bis(4-isocyanatocyclohexyl) propane; 3-isocyanatomethyl-3,5,5-trimethylcyclohexylisocyanate, referred to also as isophorone diisocyanate or IPDI; transcyclohexane-1,4-diisocyanate; m-xylylene diisocyanate; m- and p-tetramethylxylylene diisocyanate; and 1,3-(diisocyanatomethyl) cyclohexane.

As mentioned above, a preferred polyisocyanate component includes about 2 to about 10 wt. % of urea groups, more preferably about 5 to about 7 wt. % of urea groups. A particularly preferred polyisocyanate component comprises a cycloaliphatic diisocyanate including about 5 to about 7 wt. % of urea groups and is most preferably a urea-modified isophorone diisocyanate comprising a mixture of isophorone diisocyanate and the urea-containing diisocyanate adduct of isophorone diisocyanate and water, such as N,N'-bis(isophorone isocyanato)urea, and in which the NCO content of the mixture is about 30 to about 33 wt. %. A most preferred urea-containing polyisocyanate monomer component comprises a mixture of isophorone diisocyanate, "IPDI", and the urea-containing IPDI product, "IPDI H-2921", each product sold by Hüls Co.

The polymeric polyol component comprises a polyether diol or polyester diol having a MW of about 500 to about 4000. Exemplary polyester diols include: polylactone diols, for example, polycaprolactone diol; and, the esterification products of a diacid and a low molecular weight diol. Exemplary diacids are adipic, succinic, palmitic, azelaic, sebacic and phthalic acid. Exemplary low molecular weight diols are ethylene glycol, propane-1,3-diol, butane-1,4-diol, and hexane-1,6-diol. Exemplary polyether diols include those described by the linear chain formula H-[O (CH$_2$)$_n$]$_m$ OH, where n is about 2 to about 6, and the branched chain formula

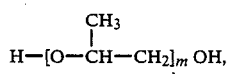

where, in both formulae, m is such that the MW of the polymer is about 500 to about 4000. A portion of the polyol component may be replaced with a polyamine monomer.

The preferred polymeric polyol comprises a polyether diol, and most preferably polytetramethylene glycol having a molecular weight of about 1000.

Exemplary short chain diols for use as chain extenders have a MW of less than about 300 and preferably a MW less than about 150 and include: ethylene glycol; propane-1,2-diol; propane-1,3-diol; butane-1,2, -1,3, or -1,4-diol; dimethyl-2,2-propane-1,3-diol (neopentylglycol); pentane-1,5-diol; hexane-1,6-diol; octane-1,8-diol; decane-1,10-diol; dodecane-1,12-diol; cyclohexanedimethanol; bisphenol A; 2-methylpentane-2,4-diol; 3-methylpentane-2,4-diol; 2-ethylhexane-1,3-diol; 2,2,4-trimethylpentane-1,3-diol; diethyleneglycol; triethyleneglycol; tetraethyleneglycol; 2-butyne-1,4-diol; butene-1,4-diol; decynediol; substituted and/or etherified, hydroquinone-bis-hydroxyethylether; bisphenol A, etherified by two or four groups of propylene oxide; or dimethylolproponic acid. The most preferred short chain diol for use as a chain extender is butane-1,4-diol.

The molar ratio of polymeric diol to chain extender diol may be expressed in terms of an OH equivalent ratio and varies as a function of the properties desired in the polyurethane sheet. The molar ratio of polymeric diol to chain extender diol is about 0.3:1 to about 1:1. As the percentage of chain extender diol is increased, the resulting polyurethane ply may harden and its modulus of elasticity increase.

A particularly preferred embodiment of the present invention comprises a polyurethane sheet wherein the adhesive ply is formed from a monomer mixture including a small amount of tri- or higher functional monomers, such as, a polyisocyanate component including less than about 15 NCO equivalent percent of a triisocyanate such as a biuret or a triisocyanurate; or a polyol component including a small amount of a polyol having a hydroxy functionality greater than two and, particularly, a polyol component such as an aliphatic polyol, for example, glycerol, trimethylolpropane, or a polyether or a polylactone polyol, having a functionality greater than two, such as a triol, and having a MW of about 90 to about 1000. An exemplary polyol includes a polypropylene glycol ester of a mixture of dimerized and trimerized linolenic acid, having an OH functionality between 2 and 3. A most preferred aliphatic polyol is a polymeric triol which most preferably comprises polycaprolactone triol. A polyurethane sheet wherein the adhesive ply is prepared from a composition including a monomer other than a diol or diisocyanate exhibits improved cohesive properties.

The OH-equivalent ratio of the polyol of functionality greater than two (hereinafter referred to as the "triol") relative to the polymeric diol and chain extender diol can vary. The polymeric diol comprises about 30 to about 45 OH equivalent percent of the total OH content in the polyurethane-forming reaction mixture; the chain extender diol comprises about 20 to about 70 OH equivalent percent; and, the triol comprises up to about 35 OH equivalent percent, such as between about 0.05 and about 35 OH equivalent percent. A preferred molar ratio of polymeric diol to triol is about 1.5:1 to about 4:1, and that of polymeric diol to chain extender diol is about 0.5:1 to about 0.8:1.

A particularly preferred embodiment of the present invention comprises a polyurethane sheet formed by "reactive casting", a term used herein to refer to a process in which a liquid film comprising a monomeric reaction mixture is formed on a horizontal support and a solid fully cured polymeric sheet prepared by polymerizing the reaction mixture in the form of the liquid film at a temperature (for example, between about 80° to about 140° C., and preferably about 100° to about 140° C.) and within a time period practical for use in a continuous industrial process. The two-ply sheet can be formed by reactive casting wherein either the thermoset or adhesive, energy-absorbing ply is formed first. A preferred embodiment of the present invention comprises a preformed two-ply sheet, one surface of which comprises a self-healing thermoset polymeric material, the other surface of which comprises the reactive cast polyurethane, and which is prepared by:

(1) forming on a horizontal support a liquid film comprising a mixture of monomers capable of forming a thermoset polymeric material;
(2) polymerizing said liquid film thereby forming a solid underlying supported ply;

(3) forming on said supported ply an overlying liquid film comprising a solvent-free mixture of monomers capable of forming a polyurethane and a polyurethane-forming catalyst;

(4) maintaining the temperature of said overlying film for a time sufficient to permit the formation of a uniformly thick and level liquid film;

(5) raising the temperature of said level liquid film and maintaining an elevated temperature sufficient to fully polymerize said film and form an overlying solid polyurethane film in less than about an hour, thereby resulting in a supported multi-ply sheet; and (6) removing said multi-ply sheet from said support.

A particularly preferred means for preparing the present sheet comprises raising the temperature of the uniformly thick and level film to said elevated temperature within a minimal time period such as less than about 3 minutes, and polymerizing the liquid film in less than about 30 minutes.

The term "uniformly thick and level liquid film" describes a film which has a uniform thickness on a level support such that a solid film prepared therefrom has optical properties acceptable for glazing applications.

A particularly preferred polyurethane for use in preparing the overlying polyurethane ply according to the present invention by reactive casting, as described above, is formed from:

(A) a cycloaliphatic polyisocyanate component including about 2 to about 10 wt. % urea groups and about 30 to about 33 wt. % of NCO groups;

(B) a polyol component including:
(1) about 30 to about 45 OH equivalent percent of a polymeric diol having a MW of about 500 to about 3000;
(2) about 20 to about 70 OH equivalent percent of a chain extender diol; and
(3) about 0 to about 35 OH equivalent percent of a triol; and (C) a polyurethane-forming catalyst;

wherein the NCO/OH ratio of said mixture is about 0.8:1 to about 1:1.

Exemplary polyurethane forming catalysts are: a tin catalyst, for example, dibutyltin dilaurate, tributyltin oxide, tin octoate; an organomercuric catalyst, for example, mercuric phenyl ester; and an amino catalyst, for example, diazabicyclo-(2,2,2)-octane, and 1,8-diazabicyclo(5,4,0)-1-decene-7. A tin catalyst is preferred in an amount comprising greater than about 0.01 to about 0.05 weight percent based on the total weight of the liquid film composition.

The composition forming the present sheet can also include a stabilizer such as bis(2,2,6,6-tetramethyl-4-piperidyl) sebecate or a phenolic antioxidant, and a sheeting or flow enhancing agent such as a fluoroalkylated ester, an acrylic resin, or a silicone resin. A fluoroalkylated ester sheeting agent is preferred.

In a most preferred form, the above composition has a viscosity such that the liquid film formed therefrom attains a uniformly thick and level form on the horizontal support within about 0.5 to about 5 minutes.

A preferred horizontal support has a surface which is smooth, level and defect-free and renders the film formed thereon with a corresponding optically defect-free surface. A most preferred horizontal support comprises a release surface such as a supported Teflon material or the like or a support coated with a release agent such as a modified addition product of ethylene oxide of the formula $$R_1-X-(C_2H_4O)_n-R_2$$

in which:

$R_1$ represents an alkyl group containing about 8 to about 18 carbon atoms or an alkyl-aryl group containing about 6 to about 12 carbon atoms in the alkyl chain;

$R_2$ represents one of the following groups:
$PO_3M_2$
$CO-CH(SO_3M)-CH_2COOM$
$CO-C_6H_4-COOM$ M is an alkali metal and X represents one of the following groupings:
O, CO-O or CO-NH and n is about 1 to about 100.

The most preferred release agent in the practice of the present invention is a disodium polyether sulfosuccinate as disclosed in U.S. Pat. No. 4,331,736.

The polyurethane sheet prepared as described above may be removed from the horizontal support and stored for later use or used immediately to form a glazing laminate as described herein below. A particular aspect of the present method relates to a sheet wherein the preferred adhesive surface is formed opposite that surface formed in contact with the horizontal support. Another aspect of the present method relates to the improved surface characteristics, such as the scratch and abrasion resistant properties, exhibited by the surface formed in contact with the horizontal release support.

The reactive cast adhesive and energy-absorbing polyurethane ply possesses both thermoplastic- and thermoset-type properties. For example, it has thermoset-type properties in that it is infusible and insoluble in most polyurethane solvents such as tetrahydrofuran and dimethylformamide, and it exhibits thermoplastic-type properties in that it softens and adheres at elevated temperatures. Furthermore, the reactive cast sheet exhibits surprising energy-absorbing properties. Although applicants do not wish to be bound by any particular theory, it is believed that the temperature, catalyst concentration, NCO/OH ratio and other parameters of reactive casting promote the formation of secondary chemical branching such as the formation of allophanate and/or biuret linkages, and that this secondary branching is, in part, responsible for the properties of the present sheet. Furthermore, it should be noted that when the NCO/OH ratio is less than about 1:1 and the polyurethane forming monomer components are difunctional in nature, the secondary branching described above does not occur to any significant extent and the energy-absorbing properties are reduced.

In a most preferred embodiment of the present invention, the present reactive cast energy-absorbing ply exhibits the following mechanical properties, measured according to AFNOR/NFT standard 46 002, 51 034 and 54 108:

a tensile strength at 10 percent elongation, $\sigma y$ at $-20°$ C. less than or equal to about 300 daN/cm$^2$;

a tensile strength at break, $\sigma R$ at $+40°$ C. greater than or equal to about 200 daN/cm$^2$;

an elongation to rupture $\epsilon R$ at $+20°$ C. ranging from about 250 to about 500 percent; and an initial tear strength Ra at $+20°$ C. with a thickness greater than or equal to about 90 daN/cm.

As mentioned above, one ply of the present two-ply sheet comprises a self-healing, thermoset polymeric material and the other ply comprises the energy absorbing, adhesive polyurethane described hereinabove. A preferred self-healing material exhibits properties such that, under normal temperature conditions, the self-healing ply has a high capacity for elastic deformation, a low modulus of elasticity, less than 2000 daN/cm$^2$ and preferably less than 200 daN/cm$^2$, and an elongation at breaking of more than 60 percent with less than 2 percent plastic deformation and preferably an elongation at breaking of more than 100 percent with less than 1 percent plastic deformation. The preferred films of this type are thermoset polyurethanes with a modulus of elasticity of about 25 to 200 daN/cm$^2$ and an elongation of about 100 to 200 percent with less than 1 percent plastic deformation.

Examples of polyisocyanates suitable for the preparation of these thermoset polyurethanes include: 1,6-hexane-diisocyanate; 2,2,4-trimethyl-1,6-hexanediisocyanate; 2,4,4-trimethyl-1,6-hexanediisocyanate; 1,3-bis-(isocyanatomethyl)benzene; bis(4-isocyanatocyclohexyl)methane; bis(3-methyl-4-isocyanatocyclohexyl)methane; 2,2-bis(4-isocyanatocyclohexyl)propane; and 3-isocyanatomethyl-3,5,5-trimethyl-cyclohexylisocyanate; and the biurets, isocyanurates and NCO prepolymers thereof. Examples of polyols suitable for the preparation of the thermoset polyurethanes include straight-chained and branched polyols, such as the following: the polyesterpolyols and the polyetherpolyols obtained by reaction of polyfunctional alcohols such as 1,2,3-propanetriol(glycerol); 2,2-bis(hydroxymethyl)-1-propanol(trimethylolethane); 2,2-bis(hydroxymethyl)-1-butanol(trimethylolpropane); 1,2,4-butane-triol; 1,2,6-hexane-triol; 2,2-bis(hydroxymethyl)-1,3-propane-diol(pentaerythritol); and 1,2,3,4,5-5-hexane-hexol(sorbitol); with either the aliphatic diacids such as malonic acid; succinic acid; glutaric acid; adipic acid; suberic acid; and sebacic acid; or with the cyclic ethers, such as ethylene oxide; 1,2-propylene oxide and tetrahydrofuran.

The molecular weight of the polyols is about 250 to about 4000 and preferably is about 450 to about 2000. Mixtures of different polyisocyanate and polyol monomers can be used. An especially preferred thermoset polyurethane is the one disclosed in U.S. Pat. Nos. 3,979,548 and 4,232,080.

The thickness of the present two-ply sheet can be varied depending on the use of the sheet. It is believed that a great many applications of use will be served satisfactorily by a sheet thickness of about 0.1 to about 1.0 mm, and preferably greater than about 0.5 mm. In such sheets, the energy-absorbing ply is about 0.1 to about 0.8 mm thick. In glazing laminate applications where impact resistance and energy-absorbing properties of the sheet are desired, the energy-absorbing ply is preferably greater than about 0.4 mm thick.

The present sheet may be utilized in a variety of laminate applications, including lenses, windows or transparencies for use in the optical, building, transportation and security industries, such as bullet-resistant windows or partitions, and side or lateral windows in motor vehicles, planes and trains. Additionally, the present sheet may be laminated to a container, for example, glass or plastic bottles. The present invention particularly relates to a bilayer glazing laminate comprising a single sheet of glass or a rigid plastic substrate and the present preformed sheet. A glazing laminate of particular interest is a vehicle windshield comprising an outer-glass ply and an inner ply of polyurethane.

The glass ply which can be employed in the laminates of the present invention can be of any type, depending upon the intended use of the laminate, but preferably is a clear, low-colored, transparent type of glass, such as the well-known silica glass, particularly soda-lime-silica glass. The nature and composition of various soda glasses is known in the art and is described, for example, in the *Encyclopedia of Chemical Technology*, by Kirk-Othmer, published by Interscience Encyclopedia Inc., New York, N.Y., Vol. 7, pages 181–189. The glass can be strengthened by either thermal or chemical tempering.

The thickness of the glass can vary depending on the ultimate end use. Typically, the glass can have a thickness of from 50 to 500 mils (0.127 to 1.27 cm). For automobile and other motor vehicle window uses, the glass will preferably have a thickness between about 65 and 180 mils (0.165 and 0.457 cm), and most preferably about 3.0 mm.

Besides glass, other rigid transparent sheets, such as polycarbonate and acrylic sheeting, can be used to form the laminates of the present invention. Also, besides bilayer laminates, the polyurethane interlayers of the present invention can be used to make tri- and multi-ply laminates in which the sheet of the present invention may be interposed between alternating rigid transparent sheets (e.g., glass, polycarbonate or acrylic). Also, the polyurethane sheet of the present invention can be used in combination as a flexible ply between alternating layers of rigid transparent sheet in combination with other flexible plastic plies such as polyvinyl butyral. Such multi-ply laminates are useful as aircraft transparencies or as bullet-proof glass for armored vehicles.

Another aspect of the present invention relates to a method for preparing a glazing laminate comprising:

(1) providing a preformed polyurethane sheet formed on a horizontal support, according to the method described above.

(2) removing said solid polyurethane sheet from said horizontal support;

(3) contacting a glass or plastic ply surface with the surface of said sheet opposite that formed in contact with said horizontal support, thereby forming an assembly; and (4) treating said assembly at elevated temperature and pressure.

In preparing a glazing laminate, the present preformed sheet can be assembled by using pressure and/or heat and is preferably contacted with a rigid plastic or glass ply under pressure, for example, by pinching between the rollers of a calenderer. The adhesive bond may be improved by subjecting the aforesaid assembly to an autoclaving cycle, for example, for about one to about two hours at a temperature of about 100° C. to about 140° C. and a pressure of about 3 to about 15 bars. A baking cycle may be used in place of an autoclaving cycle.

The adhesive strength of the laminates of the present invention may be measured by the 90 degree angle peel test described in NASA Tech Brief 65-10173. A 5 cm wide strip of laminate is adhered to a pull bar and a separating force applied to the laminate at a 90° angle and adjusted to result in separation of the laminate at a rate of 5 cm/min. The adhesive force needed to separate the laminate is reported hereinbelow in units of decanewtons (daN) per 5 linear cm.

The degree of adhesion in bilayer glass laminates of the present invention is recommended to be about 2 daN/5 cm to about 15 daN/5 cm, preferably about about 3 daN/5 cm to about 11 daN/5 cm. This adhesion is low enough to allow sufficient polyurethane ply to release from the glass ply so that it can stretch without tearing to absorb impacting energy, yet the degree of adhesion is sufficient for retention of broken glass. Higher degrees of adhesion, that is, much higher than about 15 daN/5 cm can result in decreases in impact resistance, described in more detail below. Lower degrees of adhesion, that is, lower than about 2 daN/5 cm are insufficient for commercial vehicle use in that delamination may occur, particularly under high humidity conditions.

Furthermore, the degree of adhesion in the present laminate should be relatively stable over a wide range of temperature and humidity conditions. By relatively stable under a wide range of temperature and humidity conditions is meant that although there may be fluctuations in the adhesive value over a period of time, the degree of adhesion remains within the range described above.

A particularly preferred embodiment of the present invention relates to a bilayer glazing laminate which exhibits energy-absorbing, optical, moisture resistant, and abrasion resistant properties in compliance with U.S. and European automotive safety regulations, and, in particular, ANSI-Z26 and ECE R43 standards. In addition to the properties measurable by the aforesaid standards, glazing laminates prepared from the present sheet exhibit self-healing properties. These properties may be evaluated by the Erichsen Test described below.

Scratch resistance—Scratch resistance may be measured by the Erichsen Type 413 tester equipped with a diamond stylus having a tip radius of 15 microns and an included angle of 50°. A sample of the sheet to be tested is adhered to a substrate such as glass, which is rotated during testing. The diamond stylus is placed on top of the surface to be tested and is attached to a calibrated arm which permits a weight of from 0 to 100 grams to be exerted through the stylus. The laminated sheet is rotated during testing and the highest value (in grams) determined at which the sheet is not permanently deformed by tearing.

Sheets of the present invention exhibit scratch resistance that is greater than about 20 g and the property of recovery after deformation, meaning that a deformation in the surface of the present sheet will disappear or recover within a period of time of less than about ten minutes.

The following test procedures are used to determine the abrasion resistance, and impact resistance of bilayer laminates of the present invention.

Abrasion resistance—Abrasion resistance may be determined according to ANSI-Z26 Test No. 17, as applicable to bilayer glass-plastic laminates in according with 49 CFR §571.205, S.5.1.2.3 (as amended Nov. 16, 1983) (corresponding to Test No. 4, ECE R43), portions of which are reproduced below.

5.17 Abrasion Resistance (Plastics), Test No. 17
5.17.1 Purpose of Test
The purpose of this test is to determine whether the plastic has a certian minimum resistance to abrasion.
5.17.2 Procedure 5.17.2.1 Apparatus
(1) The apparatus for the abrasion shall be the Taber Abraser or its equivalent. A load of 500 grams shall be employed on each wheel.
(3) An abrasive wheel meeting the following requirements at the time of the test shall be used:
(b) . . . The test shall be made with the pressure applied vertically along a diameter of the wheel, and reading taken 10 seconds after full application of the pressure. Each wheel shall have a durometer hardness of 72±5.
(4) The turntable of the Abraser shall rotate substantially in a plane with a deviation at the distance of 1/16 inch (1.59 mm) from its periphery of not greater than ±0.002 inch (±0.05 mm).
(5) An integrating sphere, photoelectric photometer constructed essentially as shown in FIG. 5 or 6 and conforming to the requirements shown below shall be used to measure the light scattered by the abraded track. . . .
5.17.2.2 Test Specimens
(1) Three 4×4-inch (102×102-mm), flat specimens, as submitted, having both surfaces substantially plane and parallel, shall be tested.
5.17.2.3 Conditioning of Specimens
The specimens shall be conditioned prior to testing for a minimum time of 48 hours at 71° F. to 75° F. (22° C. to 24° C.) and 50% ±2% relative humidity.
5.17.2.4 Method of Test
The test method shall be as follows:
(1) Level the Taber Abraser.
(2) . . . The load to be used is 500 grams on each wheel.
(4) Measure the initial haze of the specimen at a minimum of four equally spaced points in the unabraded area in accordance with 5.17.2.1(5)(m). The results shall be averaged for each specimen. In lieu of the four measurements, an average value may be obtained by rotating the specimen at three or more revolutions per second.
(5) The specimen shall be mounted on the specimen holder so that it rotates substantially in a plane and subjected to abrasion for 100 cycles. Specimens shall be carefully wiped after abrasion with dry lens paper (or its equivalent).
(6) Measure the light scattered by the abraded track at a minimum of four equally spaced points along the track. . .
The average initial haze determined by 5.17.2.4(4) shall be subtracted from the average total light scattered as measured by 5.17.2.4(6), the difference representing the light scatter resulting from abrading the specimen.
5.17.3 Interpretation of Results
The arithmetic mean of the percentages of light scattered by the three specimens as a result of abrasion shall not exceed 15.0%.*

*4.0 percent as per 49 CFR §571.205

The energy-absorbing properties of the present laminates can be evaluated according to Regulation R43, Test Nos. 4.2 (large ball test [2.26 kg]), and 4.3 (small ball test [227 g]), portions of which are reproduced below.
4.2. Ball-impact test - 2.26 kg
  4.2.1. Number of test pieces
  Six square test pieces of 10
300 ± 0 mm
side shall be subjected to testing.
4.2.2 Test method
   4.2.2.1. The method shall be that described in annex 3, paragraph 2.2. [impact occurs on the plastic face of the bilayer]*
   4.2.2.2. The height of drop (from the underface of the ball to the upper face of the test piece) shall be 25
4 m ± 0 mm.

4.2.3. Interpretation of results
   4.2.3.1. The ball-impact test shall be deemed to have given a satisfactory result if the ball does not pass through the glazing within five seconds after the moment of impact.
   4.2.3.2. A set of test pieces submitted for approval shall be considered satisfactory from the point of view of mechanical strength if one of the following two conditions is met; that is to say, if:
      4.2.3.2.1. All the tests give a satisfactory result; or
      4.2.3.2.2. One test having given an unsatisfactory result, a further series of tests carried out on a new set of test pieces gives satisfactory results.
4.3. Ball-impact test - 227 g.
   4.3.2. Number of test pieces.
   Twenty square test pieces of 10
300 ± 0 mm
side shall be subjected to testing.
4.3.3. Test method
   4.3.3.1. The method used shall be that described in annex 3, paragraph 2.1. [impact on glass side of bilayer laminate]* Ten specimens shall be tested at a temperature of +40° C.±2° C. and then at a temperature of −20° C.±2° C.
   4.3.3.2. The height of drop for the various thickness categories and the mass of the detached fragments are given in the table below:

| | +40° C. | | −20° C. | |
|---|---|---|---|---|
| Thickness of Test Piece | Height of fall (m) | Maximum permitted mass of the fragments (g) | Height of fall (m) | Maximum permitted mass of the fragments (g) |
| mm e < 4.5 | 9 | 12 | 8.5 | 12 |

4.3.4. Interpretation of results
   4.3.4.1. The ball-impact test shall be deemed to have given a satisfactory result if the ball does not pass through the glazing. If the interlayer is not torn, the weight of fragments detached from the side of the glass opposite to the point of impact must not exceed the appropriate values specified in paragraph 4.3.3.2. above.
   4.3.4.2. A set of test pieces submitted for approval shall be considered satisfactory from the point of view of mechanical strength if one of the following two conditions is met; that is to say, if:
      4.3.4.2.1. Not less than eight tests at each test temperature gives a satisfactory result; or
      4.3.4.2.2. More than two tests at each test temperature having given an unsatisfactory result, a further series of tests carried out on a new set of test pieces gives satisfactory results.

* bracketed comments are not part of the text

Impact resistance may be evaluated also according to ANSI-Z26 Test No. 26 (Large Ball Test), Test No. 12 (Small Ball Test) and Test No. 9 (7 oz Dart Test), hereby incorporated by reference. Bilayer laminates of the present invention wherein the present preformed sheet comprises an adhesive ply of greater than about 0.4 mm thick, and preferably greater than about 0.5 mm thick, exhibit impact resistant properties which comply with the ECE R43 and ANSI-Z26 standards described above.

Examples of the compositions, preformed sheets, glazing laminates and methods for the preparation thereof according to the present invention are described below.

EXAMPLE 1

A multi-ply sheet including a layer of self-healing thermoset material is prepared by casting, on a horizontal release-coated glass support, a liquid mixture comprising:
   1000 g of a polyether prepared by the condensation of 1,2-propylene oxide with 2,2-bis(hydroxymethyl)-1-butanol and having a free hydroxyl content of about 10.5 to about 12 percent and a molecular weight of about 450;
   10 g of a stabilizer;
   0.5 g of dibutyl tin dilaurate;
   1 g of a sheeting agent; and
   1020 g of a biuret of 1,6-hexanediisocyanate having a free NCO content of about 23.2 percent.

The cast liquid film forms a uniformly level layer 0.19 mm thick and is fully cured to a solid supported thermoset polyurethane by raising the temperature of the film to about 120° C. for about 15 minutes. The cured thermoset polyurethane has self-healing properties.

An energy absorbing adhesive ply of polyurethane is formed on the solid supported thermoset material by casting a 0.53 mm thick liquid film comprising a mixture of Components A, B, and C, described below.

| | Equivalents | | |
|---|---|---|---|
| | NCO | OH | Wt % |
| Component A: | | | |
| urea modified monomer mixture of 3-isocyanato-3,5,5-trimethyl-cyclohexane isocyanate [NCO content is about 31.5% by weight] | 1 | — | — |
| Component B: | | | |
| polytetramethyleneglycol, MW 1000* | — | 0.37 | — |
| 1,4-butanediol | — | 0.63 | — |
| Component C: | | | |
| dibutyl tin dilaurate | — | — | 0.02 |
| sheeting agent | — | — | 0.05 |
| stabilizer | — | — | 0.50 |

*sold as Polymeg 1000 by the Quaker Oats Co.

The composition is degassed in vacuo, heated to a temperature of about 40° C. and cast onto the supported thermoset solid film maintained at a temperature of about 40° C. The composition is cast using a casting head such as disclosed in French patent No. 2,347,170. The composition is allowed to form a uniformly level liquid film on the horizontal support, after which the temperature of the level liquid film is raised within a period of time of less than a few minutes to about 120° C. and maintained at about 120° C. for about 25 minutes. The resulting fully polymerized two-ply polyurethane sheet is removed from the horizontal support and may be stored for later use or used immediately in the manufacture of a glazing laminate.

A glazing laminate prepared from the two-ply sheet of the present example is assembled by contacting a glass sheet (2.6 mm thick) with the surface of the two-ply sheet opposite that of the thermoset self-healing surface. The resulting assembly is subjected subjected to a prepressing stage by passing it between two calenderer rollers, for example, by using the apparatus disclosed in U.S. Pat. No. 4,327,634. The prepressed laminate is subjected to an autoclaving cycle comprising treating the laminate at a temperature of about 135° C. and a pressure of about 10 bars for about two hours. The properties of the resulting laminate are presented in Table 1 below.

EXAMPLE 2

A multi-ply sheet having a 0.41 mm thick self-healing thermoset ply and 0.29 mm thick energy-absorbing adhesive polyurethane ply is prepared according to the method and compositions described in Example 1 above.

A glazing laminate is manufactured from this sheet and the properties thereof presented in Table I below.

EXAMPLE 3

A multi-ply sheet having a 0.315 mm thick self-healing thermoset ply and a 0.415 mm thick energy-absorbing polyurethane ply is prepared according to the method and compositions described in Example 1 above.

A glazing laminate is manufactured from this sheet and the properties thereof presented in Table I below.

EXAMPLE 4

A multi-ply sheet having a 0.39 mm thick self-healing thermoset ply and a 0.39 mm energy-absorbing polyurethane ply is prepared according to the method described in Example 1 above, except that the composition forming the energy-absorbing polyurethane ply comprises a mixture of Components A, B and C, described below.

|  | Equivalents | | |
|---|---|---|---|
|  | NCO | OH | Wt % |
| Component A: | | | |
| urea modified monomer mixture of 3-isocyanato-3,5,5-trimethyl-cyclohexane isocyanate [NCO content is about 31.5% by weight] | 1 | — | — |
| Component B: | | | |
| polytetramethyleneglycol, MW 1000* | — | 0.35 | — |
| 1,4-butanediol | — | 0.45 | — |
| polycaprolactone triol** | — | 0.20 | — |
| Component C: | | | |
| dibutyl tin dilaurate | — | — | 0.02 |
| sheeting agent | — | — | 0.05 |
| stabilizer | — | — | 0.50 |

*sold as Polymeg 1000 by the Quaker Oats Co.
**sold as NIAX 301 by Union Carbide.

A glazing laminate is manufactured from this sheet and the properties thereof presented in Table I below.

EXAMPLE 5

A multi-ply sheet having a 0.31 mm thick self-healing thermoset ply and a 0.48 mm thick overlying polyurethane ply is prepared according to the method described in Example 1 above, except that the composition forming the overlying polyurethane ply is described in Example 4, above.

A glazing laminate is manufactured from this sheet and the properties thereof presented in Table I below.

EXAMPLE 6

A multi-ply sheet having a 0.16 mm thick self-healing thermoset ply and a 0.66 mm thick energy-absorbing polyurethane ply is prepared according to the method described in Example 1 above, except that the composition forming the energy-absorbing polyurethane ply comprises a mixture of Components A, B and C, described below.

|  | Equivalents | | |
|---|---|---|---|
|  | NCO | OH | Wt % |
| Component A: | | | |
| urea modified monomer mixture of 3-isocyanato-3,5,5-trimethylcyclo-hexane isocyanate [NCO content is about 31.5% by weight] | 1 | — | — |
| Component B: | | | |
| polytetramethyleneglycol, MW 1000* | — | 0.35 | — |
| 1,4-butanediol | — | 0.55 | — |
| polycaprolactone triol** | — | 0.10 | — |
| Component C: | | | |
| dibutyl tin dilaurate | — | — | 0.02 |
| sheeting agent | — | — | 0.05 |
| stabilizer | — | — | 0.50 |

*sold as Polymeg 1000 by the Quaker Oats Co.
**sold as NIAX 301 by Union Carbide.

A glazing laminate is manufactured from this sheet and the properties thereof presented in Table I below.

The following examples demonstrate the reduction in the energy-absorbing properties per unit thickness of energy-absorbing polyurethane ply in bilayer laminates of the present invention which include external adhesion promoters.

EXAMPLE 7

A multi-ply sheet having a 0.32 mm thick self-healing thermoset ply and a 0.42 mm thick energy-absorbing polyurethane ply is prepared according to the method, and using the compositions, described in Example 1 above. A glazing lamiante is prepared as described in Example 1 except that the surface of the glass sheet to be contacted with the multi-ply sheet is coated with a silane adhesion promoter. The properties of the resulting laminate are presented in Table I below and show a marked decrease in energy-absorbing properties in comparison to the laminate of comparable ply thicknesses and identical compositions of Example 3 above.

EXAMPLE 8

A multi-ply sheet having a 0.46 mm thick self-healing thermoset ply and a 0.56 mm thick energy-absorbing polyurethane ply and glazing laminate prepared from said sheet are prepared as in Example 7, above, and the properties thereof presented in Table I below. The greater than 1 mm thick sheet results in a laminate having acceptable energy-absorbing properties despite a high adhesion value.

The following example demonstrates the marked reduction in energy-absorbing properties of the present laminates which include an energy-absorbing polyurethane ply prepared by solution casting.

EXAMPLE 9

A multi-ply sheet having a 0.19 mm thick self-healing thermoset ply and a 0.53 mm thick adhesive polyurethane ply is prepared according to the method, and using the compositions, described in Example 1, above, except that the adhesive ply is formed by the successive casting and evaporation of a solution of polyurethane prepared by solution polymerization. The properties of the glazing laminate prepared from this sheet are described in Table I below.

EXAMPLE 10

A multi-ply sheet having ply thicknesses of Example 1, above, is prepared according to the method, and using the composition of Example 1, above, except that the overlying adhesive polyurethane ply is polymerized at about 60° C. for about 20 hours. The properties of the glazing laminate prepared from this sheet are presented in Table 1 below.

thickness from 0.39 mm to 0.48 mm results in a laminate passing the R-43 impact tests.

Examples 7 and 8 demonstrate the adhesive variable affecting the energy-absorbing properties of the present laminate. The higher adhesive strength possessed by the laminate of Example 7 results in a reduction in impact resistance. Example 8 shows that a thicker energy-absorbing layer can result in adequate energy-absorbing properties despite a high adhesive value.

The adhesive ply in Example 9 is formed by solution polymerization and casting and does not exhibit energy-absorbing properties sufficient to comply with the R-43 standard at a ply thickness of 0.53 mm.

The adhesive ply in Example 10 is formed by polymerization at 60° C. for 20 hours and does not possess the desired low temperature impact-resistant properties required to pass the R-43 standard.

The sheets and laminates of Examples 1 to 10 have the optical properties required for their use in automotive safety glass in compliance with ANSI-Z26 standards. The sheets and laminates of Examples 1, 3, 5, 6 and 8 comply with ANSI-Z26 Tests 1 to 4, 9, 12, 15 to 19, 24, 26 and 28 as modified by Safety Standard No. 205, *Glazing Materials* [49 CFR 571.205, S.5.1.2.3, as

TABLE I

| EXAMPLE NO. | ADHESIVE STRENGTH | | IMPACT RESISTANCE ECE R 43 TESTS | | | SCRATCH RESISTANCE Erichsen (g) | ABRASION RESISTANCE (% haze) |
|---|---|---|---|---|---|---|---|
| | (daN/5 cm) | (psi) | 2.26 kg ball | 227 g ball −20° C. | +40° C. | | |
| 1 | 10 | 11.4 | 8 m | 11 m | 13 m | >20 g | <4% |
| 2 | 10 | 11.4 | 3.5 m | 9 m | 9 m | " | " |
| 3 | 10 | 11.4 | 4.5 m | 10 m | 13 m | " | " |
| 4 | 4 | 4.6 | 3 m | 8 m | 8 m | " | " |
| 5 | 3 | 3.4 | 4.5 m | 10 m | 12 m | " | " |
| 6 | 3 | 3.4 | 9 m | 13 m | 13 m | " | " |
| 7 | 20 | 22.8 | 3.5 m | — | — | " | " |
| 8 | 20 | 22.8 | 8 m | 11.5 m | 13 m | " | " |
| 9 | 8 | 9.1 | 3.5 m | 4 m | 3 m | " | " |
| 10 | — | — | 6 m | 6 m | 13.5 m | " | " |

DISCUSSION OF LAMINATE PROPERTIES

The glazing laminates of Examples 1 through 10 exhibit adhesive bonds which are moisture resistant and do not delaminate, form bubbles or exhibit any irreversible defects after being subjected to the temperature and humidity conditions of ANSI-Z26 Test Nos. 3 and 4. The glazing laminates of the examples exhibit little or no change in their adhesive strengths measured about 48 hours after the completion of the tests.

All of the laminates exhibit scratch resistant properties of greater than 20 g, as measured by the Erichsen apparatus, and possess an exposed ply of self-healing material in which deformations disappear within less than about 10 minutes.

The laminates of Examples 1, 3, 5, 6 and 8 have energy-absorbing properties which comply with the requirements of ANSI-Z26 Test Nos. 9, 17 and 26 and ECE Regulation No. 43 Test Nos. 4.2 and 4.3. Examples 2, 3, 4 and 5 demonstrate the thickness variable affecting the energy-absorbing properties of a bilayer glazing laminate. Examples 2 and 3 utilize the identical energy-absorbing polyurethane but differ in the thickness of the ply: the ply of Example 2 is 0.29 mm thick and does not comply with the R-43 standards, while the ply of Example 3 is 0.42 mm thick and passes the R-43 tests. A similar comparison is possible between Examples 4 and 5 where an increase in energy absorber ply amended Nov. 16, 1983], and therefore may be used in vehicle safety windshields in the U.S.

We claim:

1. A preformed flexible multi-ply transparent sheet, effective for use in a bilayer glazing laminate, having optical, moisture-resistant, and energy-absorbent properties effective for use in a bilayer glazing laminate, one ply which comprises a self-healing thermosetting polymeric material, the other ply which comprises an energy-absorbing polyurethane ply which is substantially non-tacky at room temperature but which is capable of being adhesive under the influence of heat and pressure, wherein said sheet is capable of maintaining, in the absence of an adhesion promoter, effective adhesion as measured by the temperature and moisture conditions of ANSI-Z26 test nos. 3 and 4, said energy-absorbing polyurethane being prepared by reactive casting a solvent-free mixture of monomers; and wherein said multi-ply transparent sheet is produced by:

(1) depositing on a horizontal support a liquid film comprising a solvent-free mixture of monomers capable of forming a thermosetting polymeric material;

(2) forming a solid film of said thermosetting polymeric material by polymerizing the monomers while on said support;

(3) depositing on said supported film a liquid film comprising:

(a) an aliphatic or a cycloaliphatic diisocyanate,
(b) a polyol component including:
  (i) about 30 to about 45 OH equivalent percent of a polymeric diol having a molecular weight of about 500 to about 3,000;
  (ii) about 20 to about 70 OH equivalent percent of a chain extender diol having a molecular weight of less than about 300, the molar ratio of said polymeric diol (i) to said chain extender diol (ii) being about 0.3:1 to about 1:1, and
  (iii) about 0.05 to about 35 OH equivalent percent of a polyol having an OH functionality greater than 2, the molar ratio of said polymeric diol (i) to said polyol (iii) being about 1.5:1 to 4:1; and
(c) a polyurethane catalyst,
  wherein the NCO/OH ratio of said mixture is about 0.8:1 to about 1:1;
(4) forming a solid, optical, energy-absorbing overlaid polyurethane ply within about an hour, thereby forming said multi-ply sheets; and
(5) removing said multi-ply sheet from said support.

2. The multi-ply preform sheet according to claim 1, wherein said molar ratio of polymeric diol to chain extender diol is about 0.5:1 to about 0.8:1.

3. The multi-ply preform sheet according to claim 1, wherein said polyol mixture includes a triol monomer and the molar ratio of said polymeric diol to said triol is about 1.5:1 to about 4:1.

* * * * *